(12) United States Patent
McCall et al.

(10) Patent No.: US 9,514,465 B2
(45) Date of Patent: Dec. 6, 2016

(54) TECHNIQUES FOR PROCESS TRACKING AND MONITORING

(75) Inventors: Glenn McCall, Canberra (AU); David Brophy, Victoria (AU); James Powell, Brainbridge Island, WA (US)

(73) Assignee: Teradata US, Inc., Dayton, OH (US)

( * ) Notice: Subject to any disclaimer, the term of this patent is extended or adjusted under 35 U.S.C. 154(b) by 2068 days.

(21) Appl. No.: 11/511,824

(22) Filed: Aug. 29, 2006

(65) Prior Publication Data

US 2007/0168206 A1    Jul. 19, 2007

Related U.S. Application Data

(60) Provisional application No. 60/712,595, filed on Aug. 30, 2005.

(51) Int. Cl.
*G06Q 30/02* (2012.01)
*G06Q 10/10* (2012.01)

(52) U.S. Cl.
CPC .......... *G06Q 30/02* (2013.01); *G06Q 10/103* (2013.01)

(58) Field of Classification Search
CPC .......... G06Q 10/00; G06Q 40/00; G06F 17/60
USPC ....................................... 705/7.11
See application file for complete search history.

(56) References Cited

U.S. PATENT DOCUMENTS

| | | | | |
|---|---|---|---|---|
| 5,729,746 A * | 3/1998 | Leonard | .................. | G06F 8/20 717/101 |
| 6,349,238 B1 * | 2/2002 | Gabbita et al. | ............... | 700/101 |
| 6,785,882 B1 * | 8/2004 | Goiffon et al. | ............... | 717/120 |
| 6,832,205 B1 * | 12/2004 | Aragones | ............... | G06Q 10/06 703/6 |
| 6,937,993 B1 * | 8/2005 | Gabbita et al. | ............... | 705/7.22 |
| 7,206,752 B2 * | 4/2007 | Kobayashi | ......... | G06Q 10/0631 700/95 |
| 7,231,356 B1 * | 6/2007 | Ward et al. | ....................... | 705/8 |
| 7,729,933 B2 * | 6/2010 | Ye | ........................ | G06Q 10/063 345/440 |
| 7,865,529 B2 * | 1/2011 | Kobayashi | .................... | 707/796 |
| 8,140,362 B2 * | 3/2012 | Deshpande | ............ | G06N 5/025 705/7.11 |
| 2005/0027550 A1 * | 2/2005 | Pritchard et al. | ................. | 705/1 |
| 2006/0047479 A1 * | 3/2006 | Desai et al. | .................. | 702/183 |
| 2007/0168206 A1 * | 7/2007 | McCall et al. | .................... | 705/1 |

OTHER PUBLICATIONS

Lee "Rule-Based Process Planning by Grouping Features", Sep. 2004, KSME Internationale Journal vol. 18, No. 12, pp. 1-9.*

* cited by examiner

*Primary Examiner* — Romain Jeanty

(74) *Attorney, Agent, or Firm* — Schwegman, Lundberg & Woessner, P.A.

(57) ABSTRACT

Techniques are presented for process tracking and monitoring. A tracking service monitors a good or service through a processing plan and takes selective measurements. A dashboard service presents the processing plan, locations for the good or service, and other metadata. The dashboard service also identifies cause and effect relationships derived from the metadata. A case management tool permits exceptions to the processing to be handled in a user-defined manner.

5 Claims, 6 Drawing Sheets

TECHNIQUES FOR PROCESS TRACKING AND MONITORING

RELATED APPLICATIONS

The present application claims priority to U.S. Provisional No. 60/712,595, entitled "Techniques for Processing and Reporting Information" filed on Aug. 30, 2005; the disclosure of which is incorporated by reference herein.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screen shots which may be described below and in the drawings that form a part of this document: Copyright© 2006, NCR Corp. All Rights Reserved.

FIELD

The invention relates generally to data processing, and more particularly to techniques for processing and reporting information.

BACKGROUND

Enterprises continue to struggle with tracking information. This is particularly noticeable within the context of the telecom industry. Call Detail Records (CDR's) appear to be one area where tracking is particularly problematic. Incorrect tracking, monitoring, and reporting can result in over billing and in more significant cases to the enterprise under billing.

Most solutions to address this problem are point solutions meaning that they do not address the entire life cycle of the CDR within a telecom's business; rather, point solutions address specific problems as they are detected.

Of course tracking and monitoring enterprise information is not strictly a telecom issue. Most industries lack sufficient services and tools to track their processes in a holistic manner. Consequently, businesses are not being run as efficiently as they could be.

It is therefore desirable to have improved techniques for process tracking and monitoring of enterprise information.

SUMMARY

In various embodiments, techniques for process tracking and monitoring are provided. In an embodiment, a process tracking system is presented. The process tracking system includes a tracking service, a dashboard service, and a case management tool. The tracking service is to manage a lifecycle for a good or service according to a processing plan and to take and to further provide measurements and metadata to the dashboard service. The dashboard service is to present the processing plan and metadata and location for the good or service, within the processing plan, in graph form within a graphical user interface (GUI). The case management service is to provide access to a case management tool to handle exceptions that occur in the process plan as identified by the tracking service and presented within the graph or the dashboard service.

DETAILED DESCRIPTION

Figure 1:
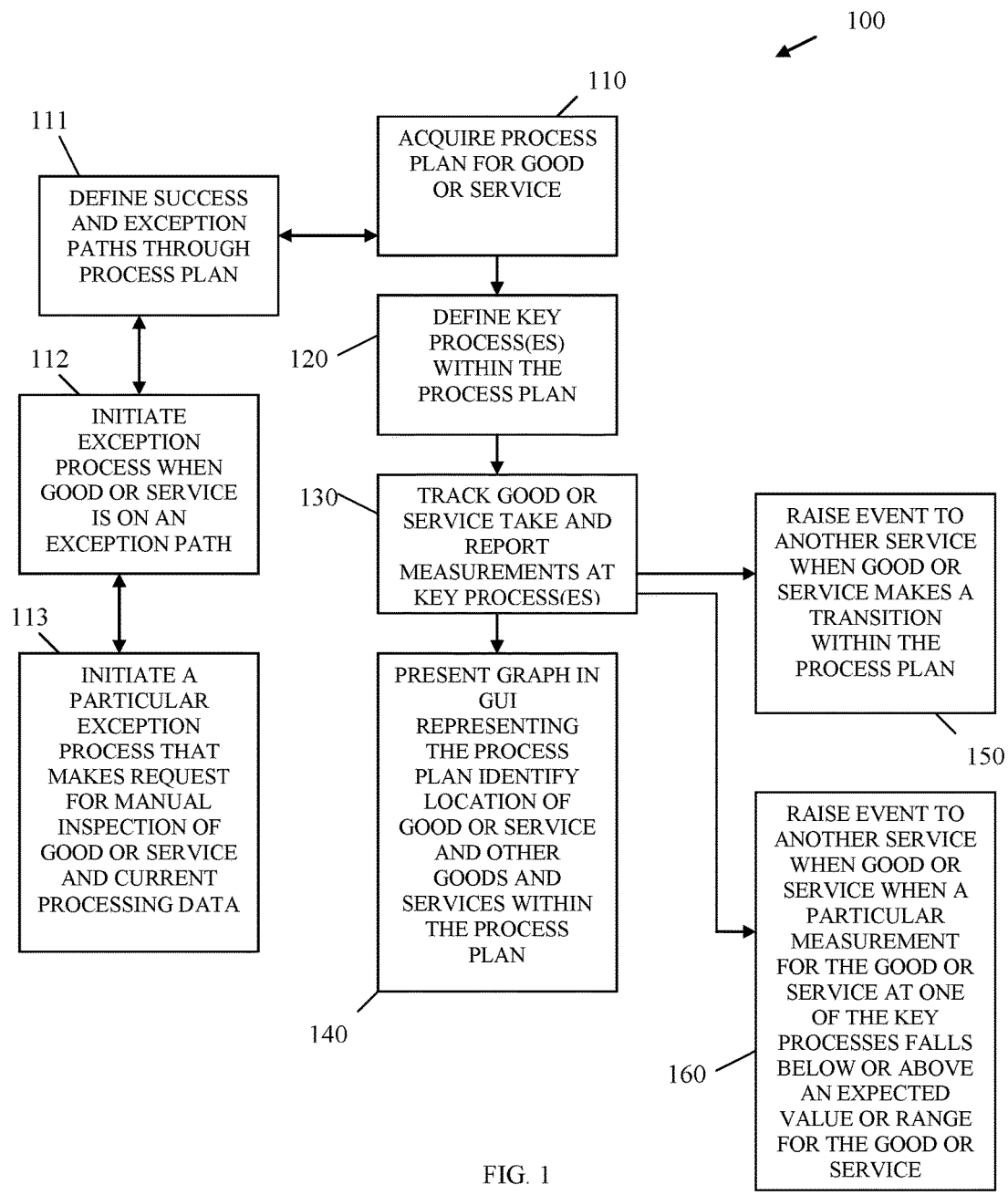
FIG. 1 is a diagram of a method for tracking goods and services, according to an example embodiment of the invention.

FIG. 1 is a diagram of a method 100 for tracking goods and services, according to an example embodiment of the invention. The method 100 (hereinafter referred to as "tracking service") is implemented in a machine-access and readable medium as instructions that when processed by a machine before the processing reflected in the FIG. 1.

The goods and services are represented via electronic identifiers or serial numbers that are capable of being tracked and monitored in an electronic environment. The goods and services are also associated with a variety of metadata, some of which may be analyst or user defined. The metadata may include a variety of information such as time a good or service was purchased, transported, etc. Other examples of metadata may include customer identifier that purchased the good or service; retail store identifier that initially sold the good or service; retail associate that transacted the sale, and the like.

The metadata may also include events detected and recorded with the good or service as it is tracked through its lifecycle. These events may be related to internal matters, such as good or service discounts, or external matters, such as actions of competitors, holiday season, etc. The events may be analyzed and processed to project one or more Key Performance Indicators (KPI's). KPI's can include particular measurements of an enterprise that are believed to be significant to running the business, such as revenues, expenses, inventories, or other financial matters, such as demand, etc.

Any particular good or service is associated with a lifecycle. That is, from the time it is produced until the time it is in the customer hands and perhaps beyond with warranty servicing. During the lifecycle of the good or service, the enterprise will perform a variety of processes to track it, to measure it in some manner at different points during the lifecycle, and to report it and the metadata. Some measurements taken during the lifecycle of the good or service or measurements taken of other goods and services during their lifecycles may influence processing and may influence actions of the enterprise.

The lifecycle of a good or service may be represented as a processing plan, where each node of that processing plan is a particular process. If things progress normally during a lifecycle of a good or service it may follow a success path through a subset of processes within the process plan to a final destination. If things are altered do to dynamic events or exceptions then the good or service may follow an exception path through the process plan.

It is with this context that the tracking service is described with reference to the FIG. 1. At 110, the tracking service acquires a processing plan that reflects an entire lifecycle for the good or service. That is, a holistic approach is used to account for every piece of information available related to the good or service and to account for every conceivable process. It is noted that even in cases where a contingency is not accounted for directly, that particular contingency can be accounted for by identifying it as an exception that is captured and processed in the manners discussed more completely herein and below.

As was mentioned, the processing plan reflects each process that a good or service may encounter during its lifecycle. The processing plan also includes rules for transition the good or service from one process to another process within the plan. For example, in telecom for a Call Detail Record (CDR) there may be a process plan that accounts for processes associated with a customer dial, various handoffs to telecom service providers, and a customer hang up.

Each node or process may also include rules for processing and using some of the metadata that is available at that particular process or node. In some cases, these rules may include taking some measurements that an analyst has defined as being particularly useful.

According to an embodiment, at 111, the tracking service may also define or recognize success or exception paths from the good or service to traverse or transition through the processing plan to a destination node or to completion. At 112, the exception paths may also be used by the tracking service to initiate one or more exception processes when the good or service is detected as being on an exception path.

In some cases, at 112, a particular exception process may be associated with initiating a manual process in which the good or service and its metadata (also referred to as current processing data herein and below) are presented to a user or analyst for manual inspection and resolution. So, if an event or condition occurs that is not accounted for within the processing plan or that is accounted from and identified as an exception condition, the good or service may be pushed to an exception path within the processing plan and from there pushed to a process where an analyst can inspect it and its current processing data and assign some action to it to either resolve it or close it.

At 120, the tracking service defines a number of key processes within the process plan for taking and perhaps reporting measurements. That is, an analyst may use an interface, such as a graphical user interface (GUI) tool, to select particular processes or nodes within the process plan and request that the tracking service take some measurements when the good or service is processed at these selected nodes. These measurements may entail using some of the available metadata and perhaps may entail querying and using information from an enterprises data warehouse or data store.

At 130, the tracking service actively tracks and monitors the good or service through the processing plan and its processes. Additionally, when the good or service is detected as being at a key process the tracking service executes the measurements associated with that key process and may report the results if warranted, such as when a policy dictates that reporting is desired.

In an embodiment, at 140, the entire processing plan may be presented in a dynamic and real-time fashion as a graph within a GUI. The interactive and real-time graph may identify a variety of information, such as but not limited to, a location within the processing plan for the good or service, locations for other goods or services, metadata, and the like. The user may later the views and the detail of information presented with the graph using the GUI. One type of presentation is described more completely herein and below with reference to the dashboard service, represented in FIG. 2.

In still another embodiment, at 150, the tracking service may be configured to report an event to another service (such as but not limited to the dashboard service represented in FIG. 2 below) when the good or service transitions from one process within the processing plan to another process within the processing plan. Again the type of event and when an event is raised may be dictated by configuration parameters associated with the tracking service, by dynamically evaluated policies; and/or by manual instruction from a user or analyst.

According to yet another aspect of the tracking service, at 160, the tracking service may proactively raise an event to another service when a measurement associated with the good or service (taken from a key process with the process plan) falls above or below an expected value or range. Again policy, configuration, or manual instruction may be used to drive the tracking service to determine when the measurement is to be reported in view of other evaluated metrics.

It is now understood how a holistic approach to tracking and monitoring information may be deployed to improve business operation. The approach accounts for an entire lifecycle of a good or service and user-defined metadata believed to be relevant and useful during the lifecycle of the good or service. Additionally, exception processing is provided to even account for situations that may not have been predefined. This is particularly useful in the telecom industry but may also be applied to any industry where tracking and monitoring of goods and services are desired.

Figure 2:
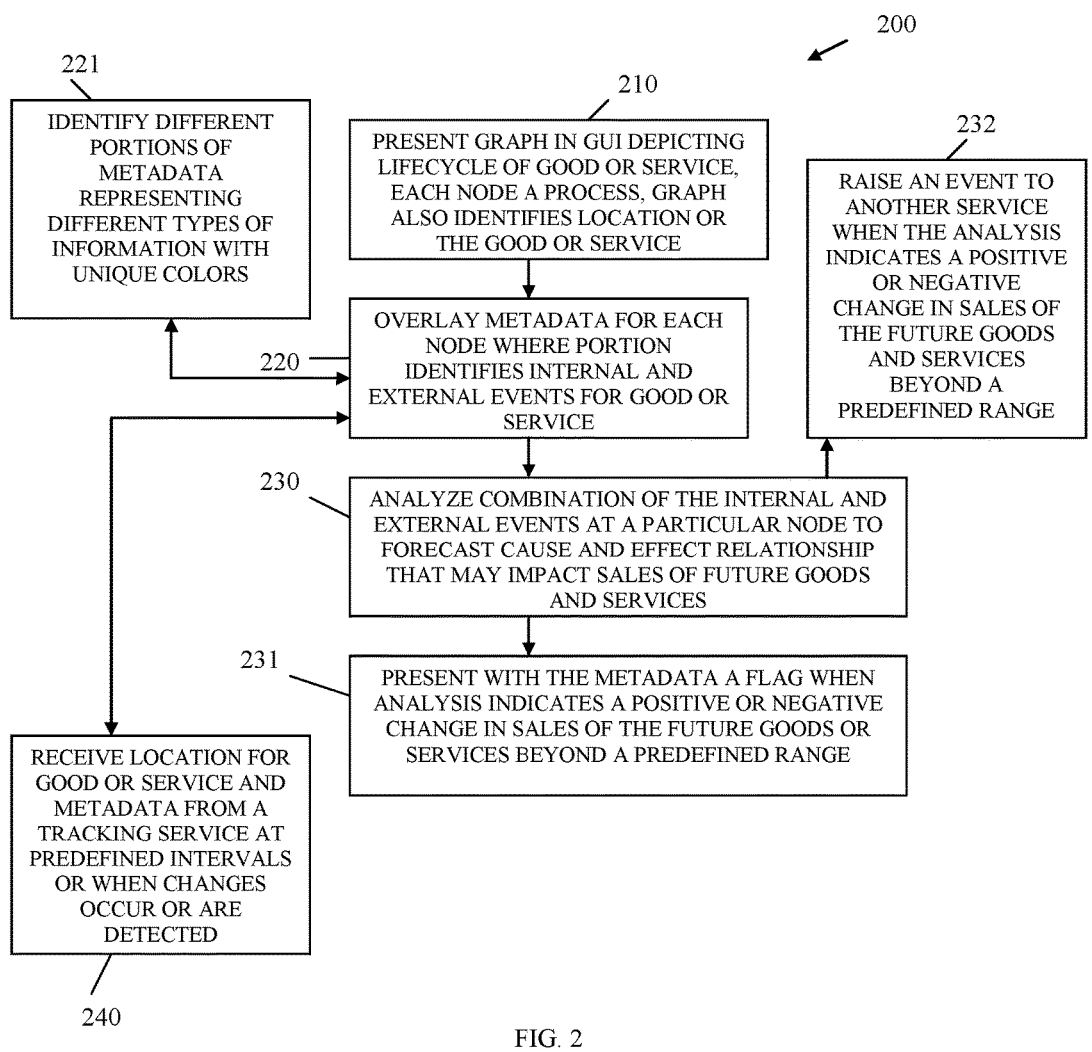
FIG. 2 is a diagram of a method for providing dashboard services, according to an example embodiment of the invention.

FIG. 2 is a diagram of a method 200 for providing dashboard services, according to an example embodiment of the invention. The method 200 (hereinafter referred to as "dashboard service") is implemented as instructions on machine-accessible and readable media that when accessed by a machine performs the processing depicted in FIG. 2. The dashboard service interacts with the tracking service represented by the method 100 of the FIG. 1 for purposes of providing real-time presentations as to the health of an enterprises' systems as it relates to the lifecycle of goods or services within the processes of the enterprise. The dashboard service also performs its own novel processing as described more completely herein and below.

At 210, the dashboard service presents a graph within a GUI that depicts or represents the lifecycle of a good or service. Each node of the graph represents a process within the lifecycle. Some processing nodes may represent automated processes while other nodes may represent manual processes. It is also noted that the graph does not have to be limited to a particular good or service, that is all goods and services associated with the lifecycle may simultaneously be depicted within the graph.

It is also noted, that the nodes and links that represent transitions between nodes may be interactive and permit users to interact with them and alter the types and amounts of information associated with those nodes or links and even perhaps alter processing. Changes in processing and captured information may be achieved via cooperation between the dashboard service and the tracking service represented by the method 100 of the FIG. 1 (described above).

At 220, the dashboard service also overlays metadata for each node with the graph. Examples of some metadata were presented above with respect to the discussion of the tracking service represented by the method 100 of the FIG. 1. At least a portion of the metadata includes internal and external events relevant to (predefined as being relevant to or subsequently dynamically identified as being relevant to) the good or service. Some internal events, by way of example only, may include things such as discounts, coupons, marketing events, etc. Some external events, also by way of example only, may include such things as actions or marketing promotions of competitors for the good or service, world events, sporting events, holidays, new laws or regulations, etc.

In some cases, at 221, different portions of the metadata may pre presented in an overlaid fashion with the graph and their respective nodes using unique text effects or colors. This permits a user or analyst to readily discern different types of information being presented with the metadata. Also, the user may interact with particular nodes and request more or less information or request that it be presented in a user-defined manner.

In an aspect of the dashboard service's processing, at 230, the dashboard service analyzes combinations of detected internal and external events associated with good or service at any key process (defined above with respect to FIG. 1) for purposes of potentially forecasting cause and effect relationships between the combinations of internal and external events. The cause and effect relationships may impact sales of future goods and services. So, predefined pieces of information believed to affect a KPI of an enterprise may be used to analyze the combinations to determine if a KPI is being impacted. However, the analysis may actually uncover new factors (via the internal and external events), which can or may be impacting KPI's. In this manner, the dashboard service may be used to uncover new cause and effect relationships between various combinations of internal and external events associated with any given good or service at any particular key processing node within the processing plan (presented as the graph in the GUI).

In some cases, at 231, if a new cause and effect relationship is uncovered or even if an existing one is identified, then the dashboard service may present a flag on a processing node for the good or service that indicates the future sales may be positively or negatively impacted by the newly discovered relationship. This permits an analyst to take a proactive approach to remedying the situation. It is also noted that the newly discovered relationship may be used with other goods and services within the lifecycle to alter them dynamically to get more favorable results for the enterprise. So, a new cause and effect relationship for a different good or service may alter an analyst to alter the processing within the lifecycle for the good or service being actively monitored.

According to an embodiment, at 240, the dashboard service may receive a current and real-time location from the good or service and the metadata associated with it from a tracking service, such as the tracking service represented by the method 100 of the FIG. 1. This information that the dashboard service presents visually via the graph and that the dashboard service permits to be viewed in a custom manner may be received from the tracking service at predefined intervals or in a real-time and dynamic fashion as changes are detected and reported from the tracking service. It may be that the tracking service simply reports the changes to an event service and the event service identifies the event as something the dashboard service is interested in knowing about.

Figure 3:
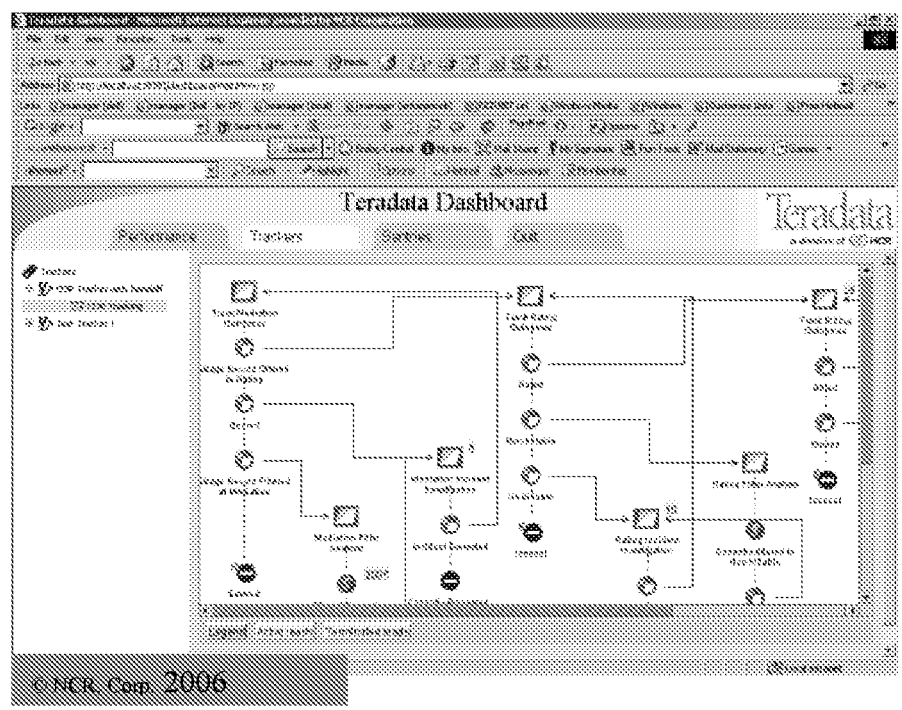
FIG. 3 is an example screenshot of a dashboard service, according to an example embodiment of the invention.

FIG. 3 is an example screenshot of a dashboard service, according to an example embodiment of the invention. The example screenshot is for an example implementation of the dashboard service and for one example view that may be presented with the graph. It is to be understood that embodiments of the invention are not to be limited to the particular details or example presented in FIG. 3.

FIG. 3 shows a process plan that includes a variety of processing nodes for a lifecycle of a particular good or service. In the example, an example CDR tracking process is presented as a graph within a GUI of a dashboard service. Again this is but one example presented as an overview to assist in visualizing how the dashboard service may appear within a GUI. The metadata presented and overlaid is customizable by the user, such that it may present summary totals for all goods or services at a particular node (as FIG. 3 does). The metadata could have just as easily reflected particular information for a particular CDR at a particular node. The point is not all the metadata has to be displayed within the graph as an overlay at any particular point in time, the view and portions of the metadata overlaid is customizable.

Figure 4:
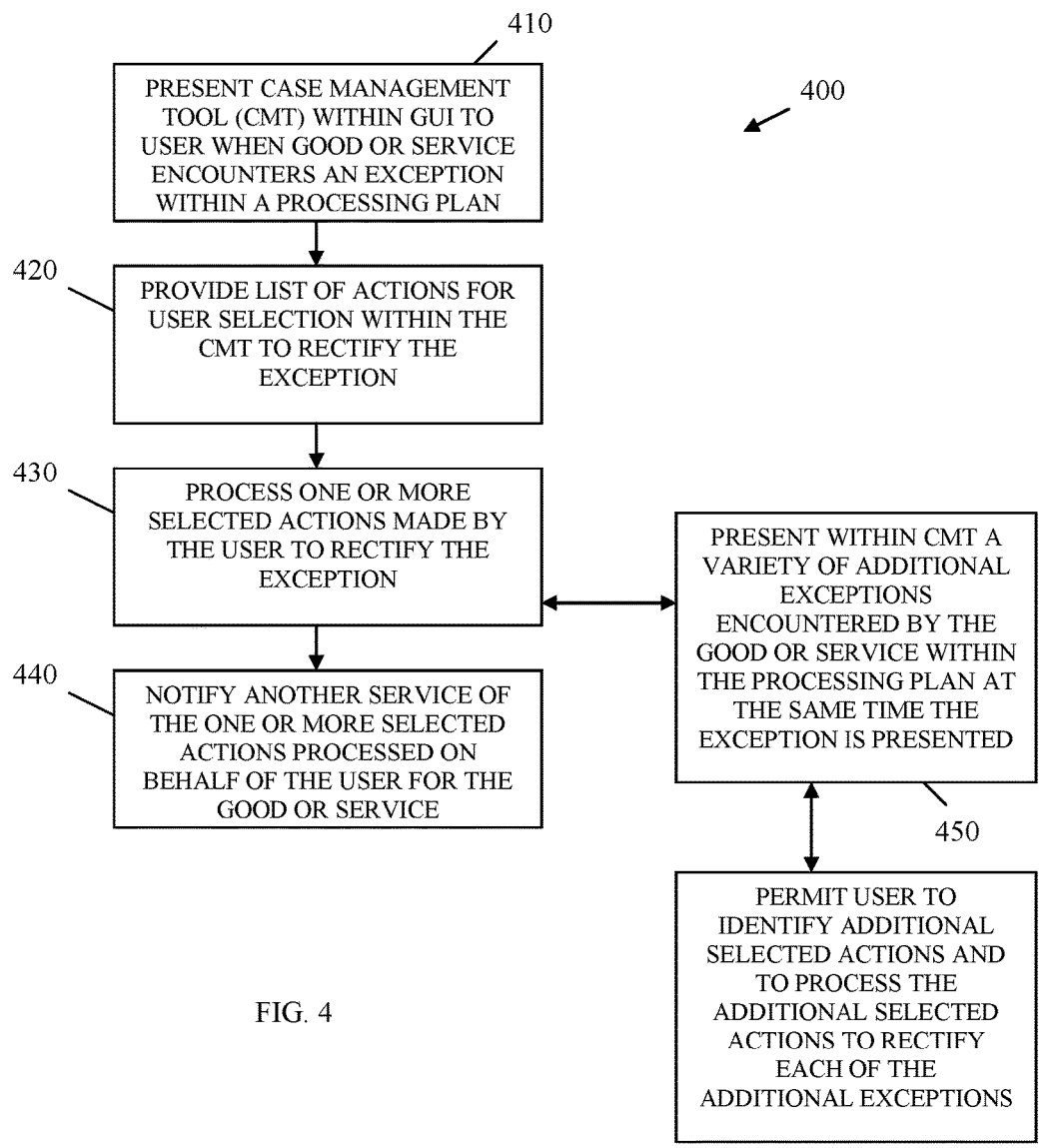
FIG. 4 is a diagram of a method for providing a case management tool, according to an example embodiment of the invention.

FIG. 4 is a diagram of a method 400 for providing a case management tool, according to an example embodiment of the invention. The method 400 (hereinafter referred to as "case management tool or service") is implemented in a machine-accessible and readable medium as instructions that when accessed by a machine perform the processing reflected in FIG. 4.

The case management service is invoked automatically or manually from within a process plan. So, the tracking service (represented by the method 100 of the FIG. 1) may invoke the case management service. Additionally, a user interacting with the dashboard service (represented by the method 200 of the FIG. 2) may manually invoke the case management service for any particular good or service.

The case management service provides a mechanism within which exceptions that are not known in advance can be dealt with. This is achieved by automatically presenting the case management service as a tool via a GUI to a user and permitting the user to assign actions to rectify problems or exceptions associated with a good or service that is traversing the processing plan.

With this context the processing of the case management service will now be discussed with reference to the FIG. 4. At 410, a case management tool is presented to a user when a good or service encounters exceptions within its processing plan. Again, the exception may be automatically identified within the processing plan based on measurements taken at key processing nodes or the exceptions may be manually enforced by a user interactively instructing the tracking service via presentations presented by the dashboard service.

At 420, the case management service provides a list of actions for user selection with the tool to rectify the exception. The selection of actions may be based on a type of exception identified to the case management service. So, sets of actions may be available to a user based on the type of exception and perhaps based on the type of good or service to which the exception relates.

At 430, the case management service receives one or more selections for the actions from the user and processes them on behalf of the user against the good or service associated with the exception. This is done to rectify the exception. It is noted that in some cased the rectification may be to completely remove and close out the good or service or it may be to have the good or service repeat a previous process within the process plan that the good or service has already been. It may also be that the actions may have the good or service be processed against a new customized action that the user-defines and supplies. In fact any action that the user deems necessary may be processed to resolve the exception. In some cases, resolution may be to simply stall or idle the good or service at a process until some other event is detected. For example, manager approval may be needed to rectify the exception.

According to an embodiment, at 440, the case management service may also notify another service, such as the tracking service, an event service, and/or the dashboard service, of the one or more selected actions, which were processed on behalf of the user for the good or service with the exception. In this manner, the case management service is tied into and interacts with the tracking and dashboard services. It is noted, that the interaction does not have to be direct between the services, although it can be, since a global event service may be used to effectuate communication between the services.

It may also be the case that a single good or service encounters more than one exception. So, exceptions may be batched or accumulated an presented all together for resolution to the user for any given good or service. Accordingly, at 450, the case management service may present a variety of additional exceptions for the good or services, which were encountered within the processing plan for the good or service. These additional exceptions may be simultaneously presented with the original exception within the same screen of the tool or same page of the tool. So, at 451, the user may be permitted to selected a variety of additional actions associated with each unique exception and have the case management service process those additional selected actions on behalf of the user for the good or service.

Figure 5:
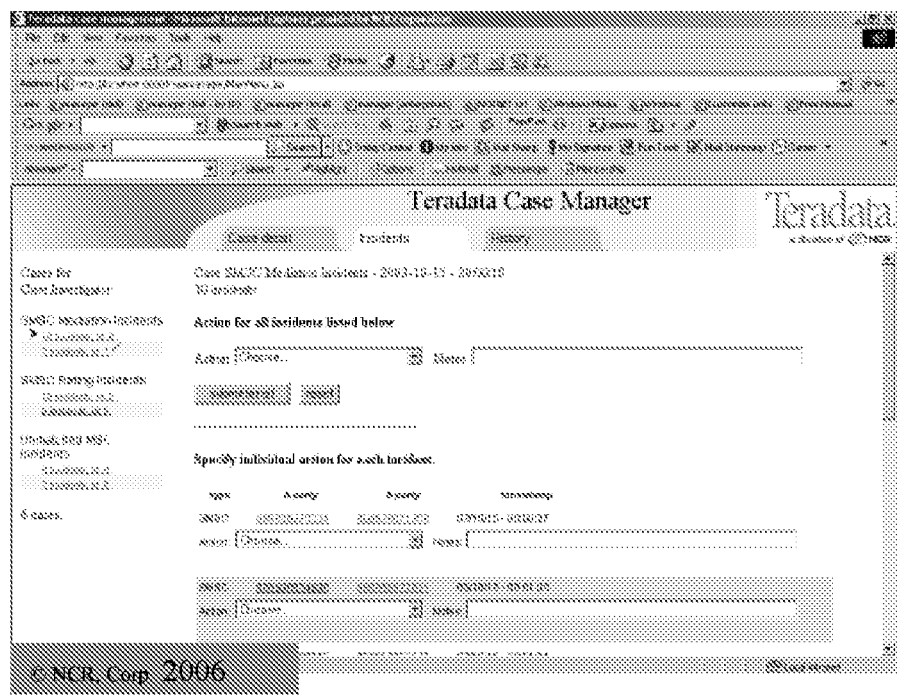
FIG. 5 is an example screenshot of a case management tool, according to an example embodiment of the invention.

FIG. 5 is an example screenshot of a case management tool, according to an example embodiment of the invention. This is but one example and similar to the discussion of FIG. 3 it is presented for purposes of visualizing how an implementation of the case management tool or service may appear to a user. It is noted that each instance of the case management tool may be customized to the lifecycle of the good or service to which it relates or to a particular user group or even for a particular exception.

In FIG. 5, a case management tool is presented for a help desk to handle exceptions that may be raised by a CDR tracker process and as depicted in FIG. 3 via an example dashboard service. Exceptions are raised and trigger the case management tool where help desk personnel enter actions for particular CDR exceptions to achieve resolution.

Figure 6:
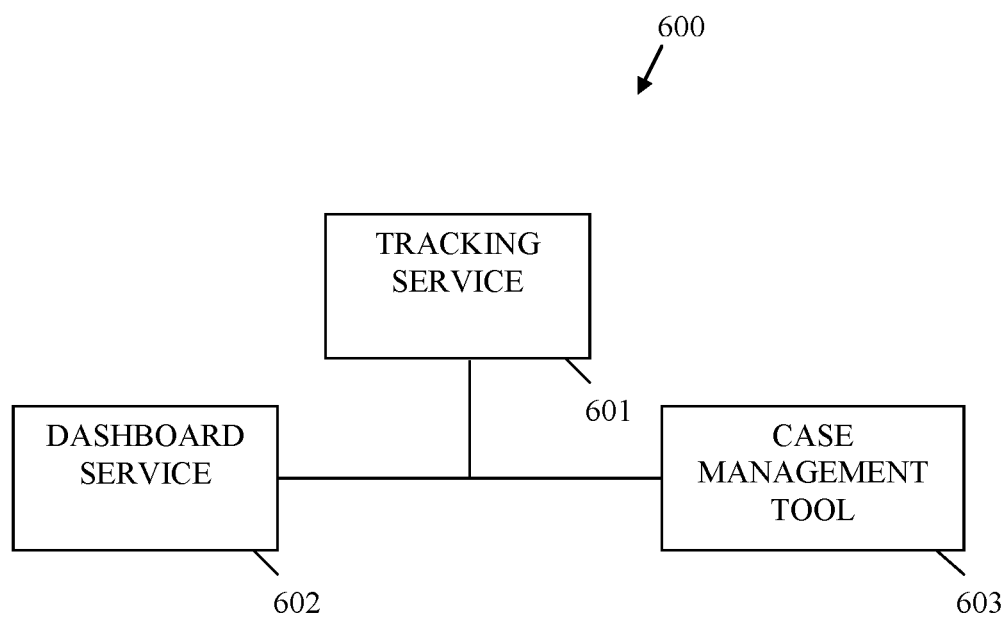
FIG. 6 is a diagram of a process tracker system, according to an example embodiment of the invention.

FIG. 6 is a diagram of a process tracker system 600, according to an example embodiment of the invention. The process tracker system 600 is implemented in a machine-accessible and readable medium as instructions that when interfaced to and executed by a machine (processing device) performs a variety of processing. Examples of the processing may be found above with the discussions of the FIGS. 1-2, and 4. The process tracker system 600 implements, among other things, the processing of the methods 100, 200, and 400 of the FIGS. 1-2, and 4, respectively.

The process tracker system 600 includes a tracking or monitoring service 601, a dashboard service 602, and a case management tool or service 603. Each of these will now be discussed in turn.

The tracking service 601 is to manage a lifecycle for a good or service according to a processing plan. The processing plan includes a variety of nodes; each node representing a processing with the lifecycle. Transitions between nodes represent movement of the good or service from one processing node to another processing node within the processing plan. The tracking service 601 also takes measurements at key processing nodes and provides metadata associated with each good or service and each processing node.

Each processing node may include more than one good or service at any particular point in time. The tracking service 601 also permits success and exclusion paths to be defined within the processing plan for the good or service. Additionally, the tracking service 601 may raise events for purpose of interacting with the dashboard service 602 or may directly communicate events with the dashboard service 602. Some example events may include such things as transitions for a good or service from one process to another process within the processing plan or measurements taking at key processing points that are outside expected ranges. The tracking service 601 may also communicate events to the case management tool 603 for purposes of achieving some exception processing on the goods or service. Example processing and features of the tracking service was presented above with reference to the method 100 of the FIG. 1.

The dashboard service 602 presents an interactive and customizable graph to the user representing the processing plan manages by the tracking service 601. That is, the dashboard service 602 provides interactive and customizable views of metadata information to users. A user can visualize in the graph the processing nodes for a lifecycle of a good or service and see the good or service or all goods and services associated with that lifecycle in real-time or near real-time. The user can also see and customize for viewing metadata. Some of this metadata reflects internal and external events associated with the goods and services, which the dashboard service 602 uses to determine if KPI's of an enterprise are impacted or may be impacted in the future. Such analysis, if positive or negative beyond a desired threshold, may be presented as a flag or as other information within the graph for ready user comprehension and perhaps action. Example processing associated with the dashboard service 602 was presented above with reference to the method 200 of the FIG. 2 and one particular example of a one screen shot for an example dashboard service was presented above with reference to FIG. 3.

The case management tool 603 provides a GUI interface for a user to resolve exception processing for a good or service. The user can handle a single exception for a good or service or a batch of exceptions for a good or service. Additionally, it may be a user can handle a plethora of exceptions for a plurality of different goods or services. The user selects one or more predefined actions to resolve exceptions or supplies a user-defined action to resolve exceptions and the case management tool 603 processes the actions and reports the processing to the tracking service 601 and perhaps the dashboard service 602. Example processing associated with the case management tool 603 was presented above with reference to method 400 of the FIG. 4 and an example help desk case management tool for CDR tracking was presented for purposes of illustration in the FIG. 5 above.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for tracking goods and services, the method implemented as executable instructions within a non-transitory computer-readable storage medium, the executable instructions represented as a tracking service that is executed by a hardware processor of a computer from the non-transitory computer-readable storage medium, the method comprising:

acquiring automatically and dynamically, by the tracking service that executes as the executable instructions on the hardware processor from the non-transitory computer-readable storage medium, a process plan for a good or service, identifying, by the tracking service, that the process plan represents reflecting an entire lifecycle for the good or service and identifying, by the tracking service, that the process plan also defines rules for moving the good or service from one process executing on the hardware processor of the computer to another process executing on the hardware processor of the computer within the process plan, and identifying, by the tracking service, that each process within the process plan is a node that includes one or more of the rules, and wherein acquiring automatically and dynamically further includes automatically and dynamically processing, by the tracking service, the process plan by: i) identifying each process that the good or the service encounters during that good or that service's lifecycle, ii) obtaining identities of operations, iii) obtaining metadata associated with parameters that are processed used by the operations, iv) obtaining metadata associated with data produced by the operations, and v) identifying a timing and order of how and when the operations are processed;

defining, by the tracking service, a number of key processes within the process plan where the good or service is measured when automatically processing the key processes of the process plan;

tracking automatically and dynamically, by the tracking service and in real time, the good or service through the process plan and recording and reporting measurements, by the tracking service, when the good or service is processed at the key processes, and wherein tracking automatically and dynamically further includes automatically processing exception processing when exceptions during the lifecycle of the good or service are encountered; and generating and presenting, by the tracking service, and within a screenshot of a Graphical User Interface (GUI), a graph representation of the process plan that identifies a location of the good or service and identifies other goods and services processing within the process plan for providing tracking of the good or service.

2. The method of claim 1 further comprising, defining, by the tracking service, one or more success paths and one or more exception paths for the good or service to move through the process plan.

3. The method of claim 2 further comprising, initiating, by the tracking service, an exception process when the good or service is detected as being on one or more of the exception paths.

4. The method of claim 3, wherein initiating further includes initiating a particular exception process that makes a request for manual inspection of the good or service and current processing data.

5. The method of claim 1 further comprising, raising, by the machine, an event to another service when the good or service makes a transition within the process plan.

* * * * *